(12) United States Patent
Berman

(10) Patent No.: US 12,504,926 B2
(45) Date of Patent: Dec. 23, 2025

(54) COMPUTATIONAL STORAGE ACCELERATION USING DRAM SHARING BETWEEN SSD IN ALL-FLASH ARRAY

(71) Applicant: SAMSUNG ELECTRONICS CO., LTD., Suwon-si (KR)

(72) Inventor: Amit Berman, Tel-Aviv (IE)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/486,318

(22) Filed: Oct. 13, 2023

(65) Prior Publication Data

US 2025/0123772 A1 Apr. 17, 2025

(51) Int. Cl.
G06F 3/06 (2006.01)

(52) U.S. Cl.
CPC .......... *G06F 3/0659* (2013.01); *G06F 3/0613* (2013.01); *G06F 3/0635* (2013.01); *G06F 3/0689* (2013.01)

(58) Field of Classification Search
CPC ..... G06F 3/0659; G06F 3/0613; G06F 3/0689
See application file for complete search history.

(56) References Cited

U.S. PATENT DOCUMENTS

| 2008/0201548 | A1* | 8/2008 | Przybylski | ............ | G06F 3/0673 |
| | | | | | 711/E12.001 |
| 2018/0211117 | A1* | 7/2018 | Ratti | .................... | G06V 10/764 |
| 2019/0102293 | A1* | 4/2019 | Li | ........................... | G06F 3/065 |
| 2024/0378019 | A1* | 11/2024 | Kim | ........................ | G06F 7/50 |

* cited by examiner

*Primary Examiner* — Nicholas A. Paperno
(74) *Attorney, Agent, or Firm* — Morgan, Lewis & Bockius LLP

(57) ABSTRACT

A method for accelerating computational storage in an all-flash-array that comprises a plurality of solid state drives (SSDs) connected in a ring topology. The method includes receiving, by a controller of a first SSD, a request to read or write data from a dynamic random access memory (DRAM) associated with the first SSD, creating a packet that includes an identifier for the first SSD in the ring topology, an identifier for the packet, and a read/write flag that identifies the request, and transmitting the packet to a next SSD in the ring topology. When the request is a read request and a read data address is not located in the DRAM, the read/write flag indicates a read-request, and when the request is a write request and the DRAM is full, the read/write flag indicates a write-request, and the packet includes data to be written.

18 Claims, 10 Drawing Sheets

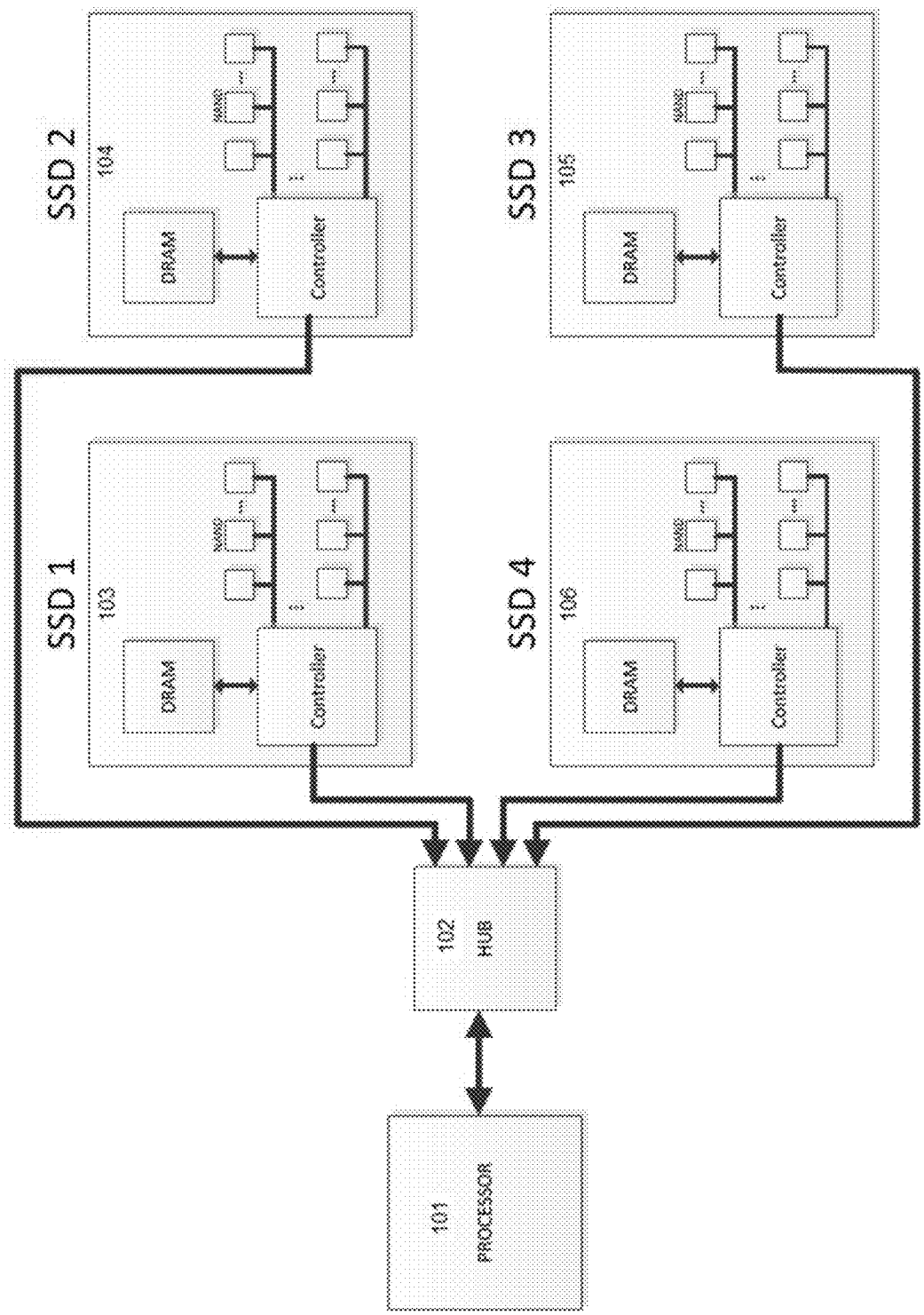
FIG. 1A Conventional AFA configuration

COMPUTATIONAL STORAGE ACCELERATION USING DRAM SHARING BETWEEN SSD IN ALL-FLASH ARRAY

TECHNICAL FIELD

Embodiments of the present disclosure are directed to storage system stacks in computer systems in which the DRAM is shared in multiple SSDs to accelerate in-storage computing.

DISCUSSION OF THE RELATED ART

A storage system stack includes devices, protocol and layers. In performance-oriented massive storage systems, flash-based solid-state drive (SSDs) devices are grouped to form an all-flash array (AFA), accessed by a single host interface protocol and mapped, organized into file-system sectors, balanced and managed with dedicated software layers.

An SSD device forms a comprehensive storage system with a processor, embedded memory and random access memory (RAM) resources that is optimized for stand-alone operation with a single host. When several SSDs are collected to function as a single storage entity, there might be cases in which one SSD has a specific component as bottleneck while other devices have the same resource being under-utilized. Such a scenario reduces the overall system performance. Even though the necessary hardware is available, it cannot be used due to lack of inter-SSD communication.

Flash-based storage systems contain multiple SSDs, where each is activated independently. SSD internal components are uniquely used for its given workload, provided by host protocol. However, when several SSDs are grouped to flash array, the storage tasks allocation management is challenging to balance due to internal processes.

Dynamic RAM (DRAM) is a necessary component in SSD for improving its read/write performance and reliability by enabling dynamic flash translation layer (FTL) management and data buffering. However, in certain workload scenarios, a DRAM can overflow and its data migrates to a NAND flash memory, resulting in severe performance degradation. Therefore, algorithms for coping with out-of-space RAM case are desired. Furthermore, the continuing cost race results in attempts to reduce DRAM space, and thus making the situation even more challenging.

An example of the architecture of an SSD network is shown in FIG. 1A, which shows a processor 101 connected to an I/O controller hub 102, which in turn is connected to each of SSD 1 103, SSD2 104, SSD 3 105, and SSD 4 106. Each SSD includes a controller, a DRAM connected to the controller and a plurality of NANDs that are connected to the controller. Although FIG. 1A shows four SSDs connected to the hub 102, this is for convenience of illustration.

SUMMARY

Embodiments of the disclosure share DRAMs between SSDs in an AFA by connecting multiple SSDs, such that when a specific SSD DRAM is out-of-space, its data can be stored on another SSD with available RAM. The gain is efficient utilization of DRAM resources and elimination of the case that single SSD has out-of-space DRAM while others have spares. All-flash array (AFA) computations share the SSD DRAM resources. In addition, a AFA can perform high performance computation, and can share the DRAM resources inside the SSDs for better performance. Analysis results show an up to 2× performance improvement in AFA performance as compared to a conventional scheme, depending on the number of SSDs, DRAM overflow probability and the performance reduction factor. As data-centers and AFA products demand grow, more components are stuffed at the basic building block. An inter-SSD connectivity structure according to an embodiment efficiently utilizes SSDs integrated components and open research directions as resource sharing and fault-tolerance. Embodiments of the disclosure can tackle cost and performance issues through efficient components utilization, and secure a competitive product at the global market.

According to an embodiment of the disclosure, there is provided a method for accelerating computational storage in an all-flash-array network that comprises a plurality of solid state drives (SSDs) connected in a ring topology, wherein each SSD of the plurality of SSDs includes a controller and a dynamic random access memory (DRAM) connected to the controller. The method includes receiving, by a controller of a first SSD, a request to read or write data from a DRAM associated with the first SSD; creating a packet that includes an identifier for the first SSD in the ring topology, an identifier for the packet, and a read/write flag that identifies the request; and transmitting the packet to a next SSD in the ring topology, The read/write flag indicates a read-request, when the request is a read request and a read data address is not located in the DRAM, and the read/write flag indicates a write request, and the packet includes data to be written, when the request is a write request and the DRAM is full.

According to a further embodiment of the disclosure, the method includes verifying that the read/write flag indicates a read request and a read data address is located in the DRAM, and reading data from the read data address in the DRAM.

According to a further embodiment of the disclosure, the method includes verifying that the read/write flag indicates a write request and the DRAM is not full, and writing data to a write address in the DRAM.

According to a further embodiment of the disclosure, the method includes receiving, by the next SSD in the ring topology, the packet; verifying that the next SSD in the ring topology differs from the first SSD in the ring topology, the read/write flag indicates a write-request and a DRAM associated with the next SSD is not full; requesting a write address for a DRAM associated with the next SSD from a controller of the next SSD; writing the data in the packet to the write address for the DRAM; updating the packet by setting the read/write flag to indicate a write-acknowledgement; and transmitting the packet to a next SSD in the ring topology.

According to a further embodiment of the disclosure, the method includes receiving, by the next SSD in the ring topology, the packet; verifying that the next SSD in the ring topology differs from the first SSD in the ring topology, and the read/write flag indicates a read-request; requesting a read address for a DRAM associated with the next SSD from a controller of the next SSD, based on the identifier for the first SSD in the ring topology and the identifier of the packet; updating the packet by setting the read/write flag to indicate a write-acknowledgement, and replacing the data to be written with data read from the read-address; and transmitting the packet to a next SSD in the ring topology.

According to a further embodiment of the disclosure, the method includes receiving, by the next SSD in the ring topology, the packet; verifying that the next SSD in the ring topology is the first SSD in the ring topology; updating incoming/outgoing packet tables of the controller of the first SSD, when the read/write flag indicates a write-acknowledgement; performing a DRAM out-of-space procedure, when the read/write flag indicates a write-request and the DRAM associated with the first SSD is full; and outputting the data of the packet to a host of the all-flash array, when the read/write flag indicates a read-acknowledgement.

According to a further embodiment of the disclosure, the packet includes fields for an SSD identifier, an identifier for the packet, a read/write request/acknowledge flag, and data to be either written to a DRAM associated with an SSD or read from a DRAM associated with an SSD.

According to an embodiment of the disclosure, there is provided an architecture for accelerating computational storage in an all-flash-array, including a plurality of solid state drives (SSDs) connected to an input/output (I/O) hub, wherein each SSD of the plurality of SSDs includes a controller, a DRAM connected to the controller, and a plurality of NAND flash memories connected to the controller, and a processor connected to the hub. The plurality of SSDs are connected in a ring topology in which each controller includes an input port and an output port, each input port of each SSD is connected by a connector to an output port of a predecessor SSD, and the input port of a first SSD of the plurality of SSDs is connected by a connector to the output port of a last SSD of the plurality of SSDs.

According to a further embodiment of the disclosure, each SSD further includes a hardware accelerator connected to the DRAM, wherein the hardware accelerator accelerates tasks other than reading or writing to the DRAM of each SSD.

According to a further embodiment of the disclosure, the architecture includes an artificial intelligence (AI) server. The AI server is an SSD that includes a processor, a DRAM connected to the processor, and a plurality of NAND memories connected to the processor.

According to a further embodiment of the disclosure, the connector is a cable.

According to a further embodiment of the disclosure, the controller of each SSD includes a DRAM manager connected to the DRAM and the output port, a packet buffer connected to the input port, the DRAM and the output port, an inter-SSD finite sate machine (FSM) connected to the packet buffer, the input port, and the DRAM manager, wherein the inter-SSD FSM performs packet routing and handling of received packets, a multiplexer that connects the DRAM manager and the packet buffer to the output port, a multiplexer that connects the DRAM manager and the packet buffer to the DRAM, and additional components that connect the DRAM manager to a host and to the NAND memories.

According to a further embodiment of the disclosure, the packet routing includes receiving, by a controller of a first SSD, a request to read or write data from a DRAM associated with the first SSD, creating a packet that includes an identifier for the first SSD in the ring topology, an identifier for the packet, and a read/write flag that identifies the request; and transmitting the packet to a next SSD in the ring topology. The read/write flag indicates a read-request, when the request is a read request and a read data address is not located in the DRAM, and the read/write flag indicates a write request, and the packet includes data to be written, when the request is a write request and the DRAM is full.

According to a further embodiment of the disclosure, the packet handling includes receiving, by the next SSD in the ring topology, the packet; verifying that the next SSD in the ring topology differs from the first SSD in the ring topology, the read/write flag indicates a write-request and a DRAM associated with the next SSD is not full; requesting a write address for a DRAM associated with the next SSD from a controller of the next SSD; writing the data in the packet to the write address for the DRAM; updating the packet by setting the read/write flag to indicate a write-acknowledgement; and transmitting the packet to a next SSD in the ring topology.

According to a further embodiment of the disclosure, the packet handling includes receiving, by the next SSD in the ring topology, the packet; verifying that the next SSD in the ring topology differs from the first SSD in the ring topology, and the read/write flag indicates a read-request; requesting a read address for a DRAM associated with the next SSD from a controller of the next SSD, based on the identifier for the first SSD in the ring topology and the identifier of the packet; updating the packet by setting the read/write flag to indicate a read-acknowledgement, and replacing the data to be written with data read from the read-address; and transmitting the packet to a next SSD in the ring topology.

According to a further embodiment of the disclosure, the DRAM manager includes an incoming packets table that includes a field for an identifier of an SSD and a field for an identifier of an incoming packet, and an outgoing packets table that includes a field for an identifier of an outgoing packet and a field for a DRAM data link.

According to another embodiment of the disclosure, there is provided an architecture for accelerating computational storage in an all-flash-array, including a plurality of solid state drives (SSDs) connected to an input/output (I/O) hub, wherein each SSD of the plurality of SSDs includes a controller, a DRAM connected to the controller, and a plurality of NAND memories connected to the controller, and a processor connected to the hub. The hub is configured to support incoming DRAM data and acknowledgement packets, and each SSD controller is configured to route DRAM read and write requests, and to handle received packets.

According to a further embodiment of the disclosure, the packet routing includes receiving, by a controller of a first SSD, a request to read or write data from a DRAM associated with the first SSD, creating a packet that includes an identifier for the first SSD, an identifier for the packet, and a read/write flag that identifies the request; and transmitting the packet to the hub, wherein the hub transmits the packet to a next SSD. The read/write flag indicates a read-request, when the request is a read request and a read data address is not located in the DRAM, and the read/write flag indicates a write request, and the packet includes data to be written, when the request is a write request and the DRAM is full.

According to a further embodiment of the disclosure, the packet handling includes receiving, by the next SSD, the packet; verifying that the next SSD differs from the first SSD, the read/write flag indicates a write-request and a DRAM associated with the next SSD is not full; requesting a write address for a DRAM associated with the next SSD from a controller of the next SSD; writing the data in the packet to the write address for the DRAM; updating the packet by setting the read/write flag to indicate a write-acknowledgement; and transmitting the packet to the hub.

According to a further embodiment of the disclosure, the packet handling includes receiving, by the next SSD, the packet; verifying that the next SSD from the first SSD, and the read/write flag indicates a read-request; requesting a read address for a DRAM associated with the next SSD from a controller of the next SSD, based on the identifier for the first SSD and the identifier of the packet; updating the packet by setting the read/write flag to indicate a read-acknowledgement, and replacing the data to be written with data read from the read-address; and transmitting the packet to the hub.

BRIEF DESCRIPTION OF THE DRAWINGS

FIG. 1A shows an example of an architecture of a current inter-SSD channel.

DETAILED DESCRIPTION

Embodiments include two implementation schemes: an I/O controller independent scheme with inter-SSD connections that includes hardware and wiring modifications, and a alternative scheme with only software changes at the I/O hub driver and SSD controller. Embodiments also provide algorithms for packet networking communication.

Figure 1B:
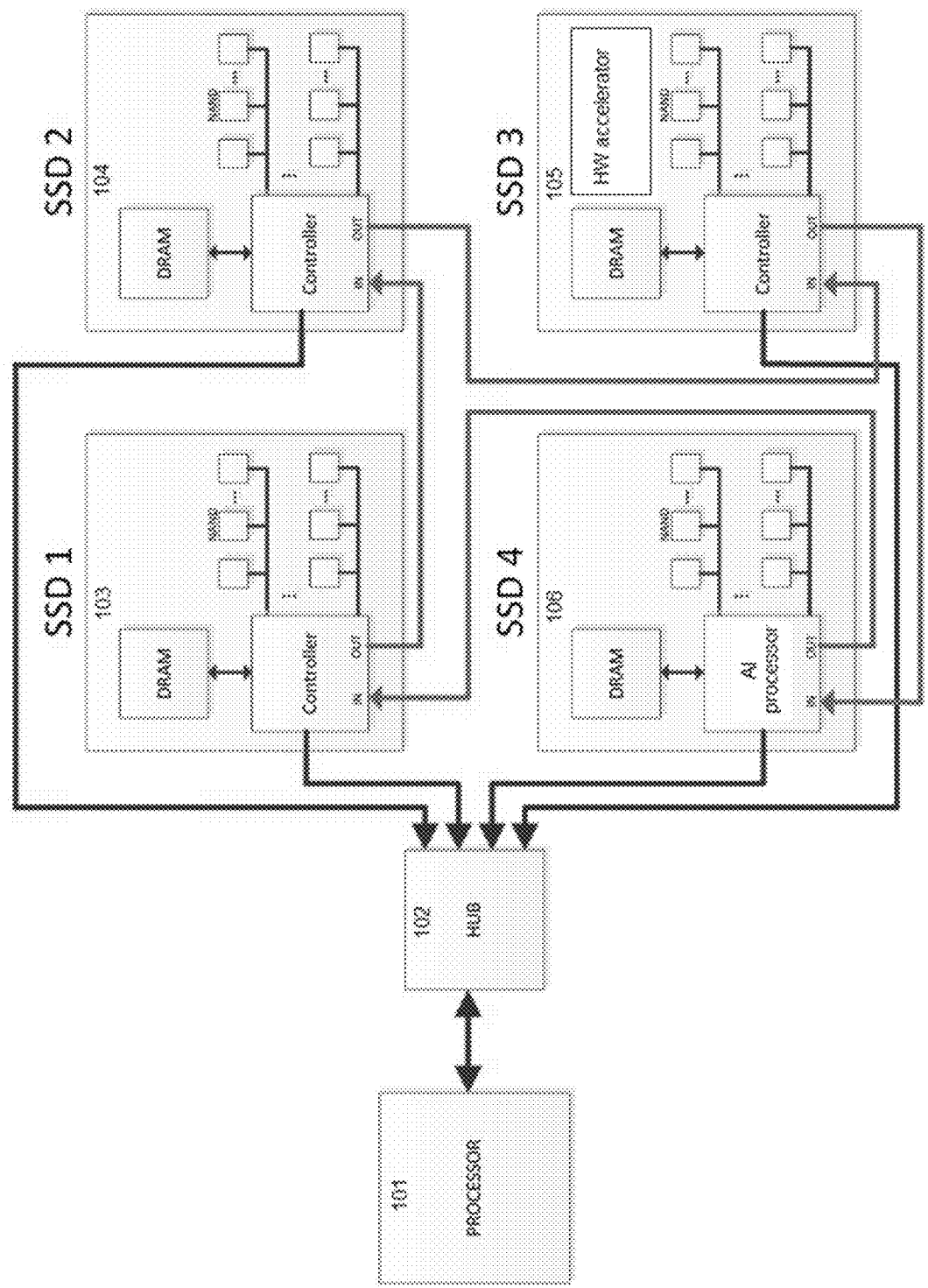
FIG. 1B shows a new connection between SSDs according to an embodiment of the disclosure.

FIG. 1B shows an SSD network according to an embodiment. The architecture of FIG. 1B differs from that shown in FIG. 1A in that each SSD controller has two additional ports "IN" and "OUT", and new connectors are added between controllers in separate SSDs to form a ring topology. A ring topology is a network topology in which each node is connected to exactly two other nodes, forming a single continuous pathway for signals through each node, and which forms a ring network. For example, each input port of each SSD is connected by a connector to an output port of a predecessor SSD, and the input port of a first SSD of the plurality of SSDs is connected by a connector to the output port of a last SSD of the plurality of SSDs. In case of a DRAM being out-of-space in a certain SSD, the data would be routed to another DRAM in an all-flash array (AFA), which is located on the other device. If no such place is found, the packet returns to the original SSD via the circular connection, and treated as in a conventional structure. In some embodiments, one or more SSDs includes a hardware (HW) accelerator that accelerates tasks other than reading or writing to the DRAM of each SSD, and one or more SSDs is an artificial intelligence (AI) server that includes a processor, a DRAM connected to the processor, and a plurality of NAND memories connected to the processor. Although FIG. 1B shows four SSDs connected to the hub 102, this is for convenience of illustration, and embodiments are not necessarily limited thereto.

Communication is based upon packet switching where a DRAM overflow results in a RAM request transmission in the controller output port. Each SSD is assigned with a unique identifier (ID), such as a serial manufacturing number, for identification. Each controller has two additional ports: IN and OUT for inter-controller communication. In the figure, SSD-1 is connected to SSD-2, SSD-2 to 3, 3 to 4, and 4 back to 1, which forms a ring topology. When a specific SSD DRAM space is required but not available, the controller transmits a packet with its SSD-ID and data through the IN port to a next SSD in the ring network. The receiving controller checks its DRAM availability and transmits an acknowledge packet with its ID if the request is issued. Otherwise, if DRAM space is not available, the original packet is passed to the next SSD through the OUT port. If none of the SSDs can fulfil the request, it passes back to the original SSD, which treats the occasion as in conventional stand-along SSD. The Hub may include additional resources for extending SSD capabilities.

Figure 3A:
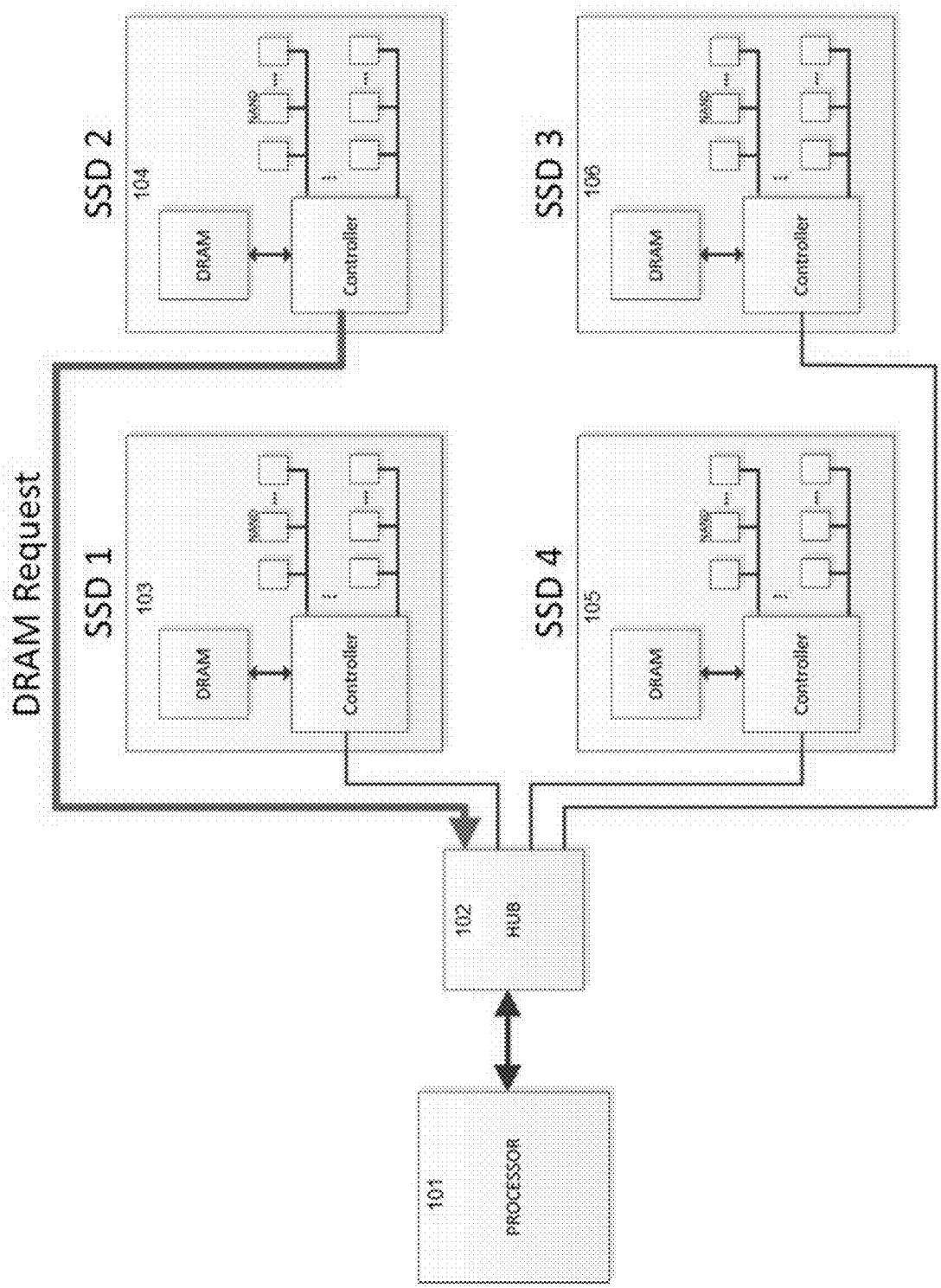
FIGS. 3A-B illustrate a connection in which the DRAM allocation is managed by the I/O controller hub according to an embodiment of the disclosure.
Figure 3B:
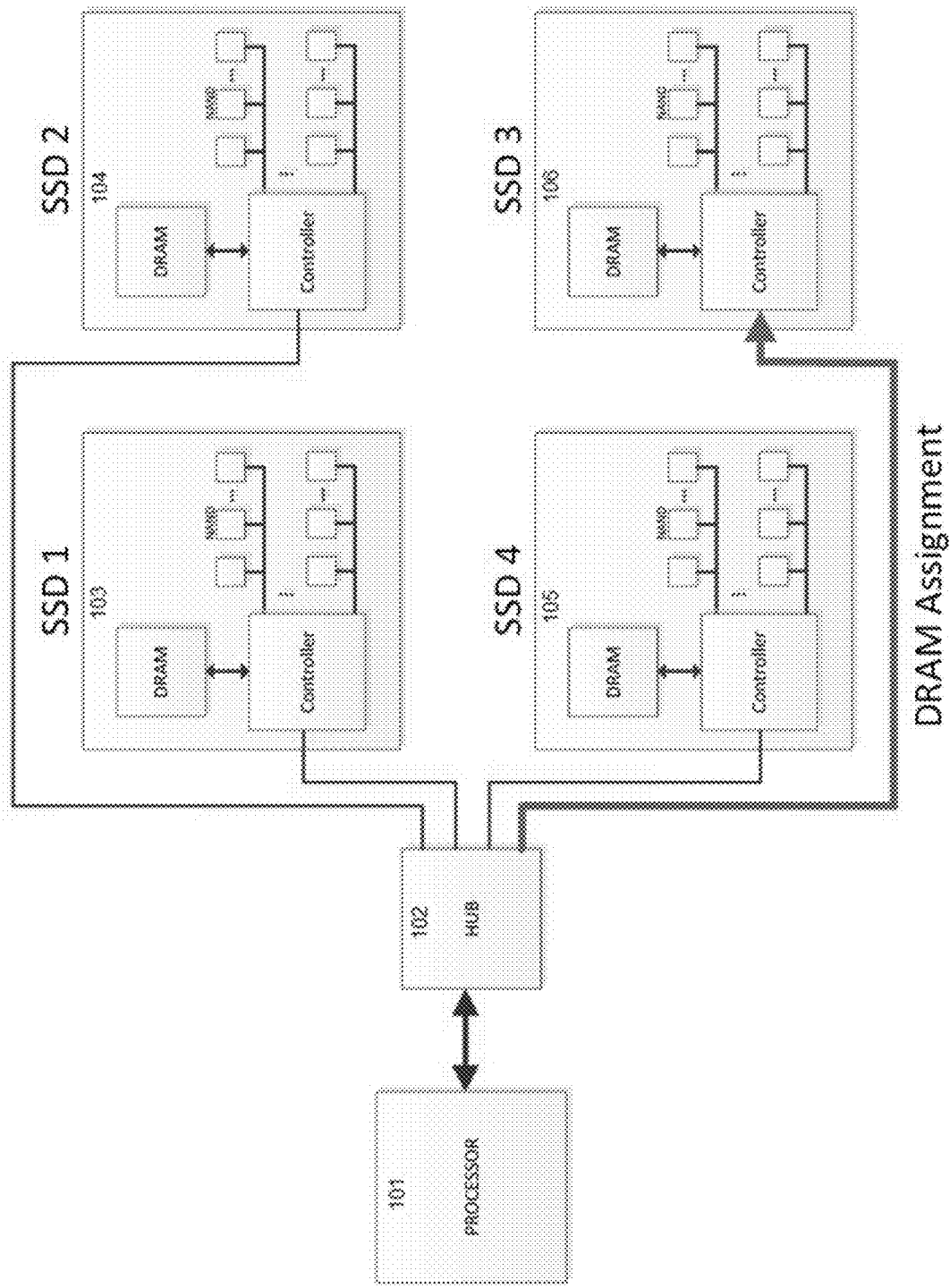

An alternative connection, in which the DRAM allocation is managed in software by the I/O controller, is shown in FIGS. 3A-B, described below. In this case, the SSD controller can request RAM space from the hub, and route the data to other SSD through the hub connection. This architecture does not require additional wiring or SSD controller ports, but only a driver and software modifications at the I/O controller and SSD controller.

The DRAM sharing ability can be used to enable and extend memory reduction, flash translation layer (FTL) compression, garbage collection operations, write buffer and inner accelerator. The inter-SSD connection can further share error-correction decoder module (ECC) or other controller resources such as processor.

I. Notations and Definitions

Notation 1 (Number of SSDs in AFA): the amount of SSDs in single AFA platform is marked with N. The AFA is assumed to include multiple SSDs, connected to a single hub or managing I/O controller that connects to host processor, as shown in FIG. 1B.

Notation 2 (Probability for DRAM overflow): In predefined SSD parameters, the probability for DRAM space demand when it is fully utilized is denoted with p.

Notation 3 (SSD Bandwidth): The average GB/Sec data rate for read/write operations is denoted with B, and r·B for with and without DRAM overflow (r<1). The reduction in SSD performance originates from the storage of DRAM data in NAND flash. Consequently, the expected bandwidth is:

$$SSD_{BW}(p) = (1-p)B + p \cdot r \cdot B = B[1 - p(1-r)].$$

For normalization purposes, BW is divided by the constant B and r is statically determined according to analysis.

Notation 4 (AFA Bandwidth): The performance of AFA is defined as the product of the number of SSDs in an AFA and the bandwidth of a single SDD:

$$AFA_{BW}(p) = N \cdot SSD_{BW}(p).$$

Since each SSD acts independently, its bandwidth can be added for total system performance.

II. Inter-SSD Communication

A. Physical Link

In an embodiment, each controller has two additional ports "IN" and "OUT" for incoming and outgoing packets. The link width and frequency of operations can be determined arbitrarily, as well as the interaction protocol.

B. Packet Structure

Figure 2:
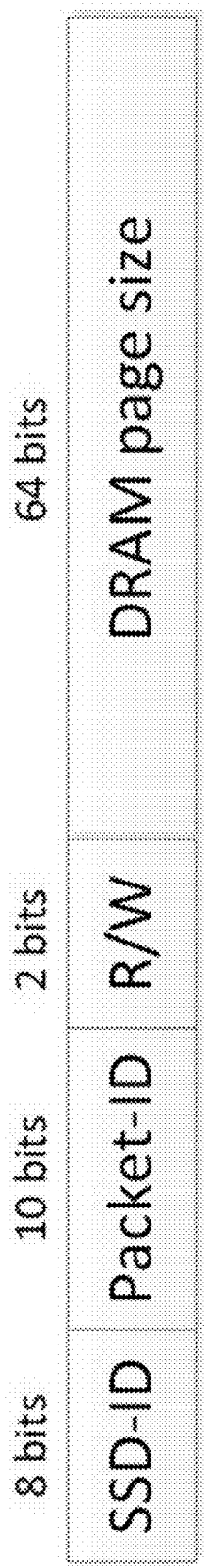
FIG. 2 illustrates the inter-SSD packet structure, according to an embodiment.

The packet size can be either 20 or 84 bits, depending whether the packet carries data or an acknowledgement. Regardless of the type of data, such as address, sector write/read data, or metadata, the packet includes a unique ID, a two-bit indication of either read or write operation, and in the case of a write request or a read answer, attached data at the size of DRAM page size, typically 64 bytes, along with SSD-ID as shown in FIG. 2. FIG. 2 illustrates the inter-SSD packet structure, according to an embodiment. Referring to FIG. 2, the contents include an SSD identifier SSD_ID that uniquely identifies each SSD in the SSD network, a unique packet identifier packet-ID that uniquely identifies the packet, a two-bit read/write instruction R/W that includes indication of request or acknowledgement of attached data, and the original SSD data to be written at a DRAM at the size of a DRAM page (typically 64 bytes). In an embodiment, the SSD identifier SSD_ID is 8 bits, and the unique packet identifier packet-ID is 10 bits. The transmission may be spread over a few cycles, depending on the bus width. The packet size is divided by the connection bus width to determine the amount of clock cycles required for transmission. For an SSD request to read data from a DRAM associated with another SSD, the packet R/W indication is {R, 0}, whereas when read data is attached on its way to a target SSD, the packet R/W indication is {R,1}. In case of a write acknowledgement of the SSD, the packet R/W indication is {W,0}, and for an SSD request to program data on other SSD, the R/W field is {W, 1}.

C. Routing and Service

A method according to an embodiment for requesting read or write to other DRAM on an AFA when an SSD DRAM is full is detailed in algorithm 1, below. The allocation of packet identification is performed in incremental order and outgoing packets identification is performed in the additional DRAM manager mechanism at the SSD controller, which attempt to store the sent packets identifications in addition to the regular DRAM data management. The case of DRAM read where data is stored in another SSD is addressed in steps (1)-(3), in which case a packet is constructed by requesting a packet identifier from a DRAM manager, and constructing the packet from the identifier of the current SSD in the AFA, the packet identifier, and the read-request instruction. The case of a DRAM write where DRAM space is not available is shown in steps (4)-(6), in which a packet is constructed from the identifier of the current SSD in the AFA, the packet identifier, and the write-request instruction. In each case, the packet is then transmitted to the next SSD in the AFA ring.

| Algorithm 1: Request for DRAM read/write |
|---|
| Input: D - RAM data bits, ID - SSD identification |
| (1)    Packet# ← get Packet# from DRAM manager |
| (2)    If (RAM read) and (address not in DRAM) Then |
| (3)        Packet ← {ID, Packet#, R0} |
| (4)    Else If (RAM write request) && (DRAM is full) Then |
| (5)        Packet ← {ID, Packet#, W1, Data} |

| Algorithm 1: Request for DRAM read/write |
|---|
| (6)    End |
| (7)    Transmit Packet to next SSD on ring |

A method according to an embodiment for treating incoming packets is shown in algorithm 2, below. In the following, the phrase "different SSD" refers to different SSDs within an SSD network, in which each SSD in the network can be identified and distinguished by its unique SSD_ID. The case of writing or reading in DRAMs of different SSDs is addressed in steps (1)-(12), in which case the SSD identifier of the SSD that has received the packet differs from the SSD identifier SSD-ID of the received packet, which identifies the transmitting SSD. The case of writing in DRAMs of different SSDs is addressed in steps (1)-(6), and the case of reading DRAMs in different SSDs is addressed in (7)-(12). If the DRAM is full or a read packet # was not found, the packet is simply routed to the next SSD on ring at step (13). The case of when the packet has returned to the originating SSD is addressed in steps (13)-(21). The originating SSD would have the same SSD_ID as that in the packet. The case of write acknowledgement is shown in steps (14)-(16), in which case the DRAM manager is updated by updating the incoming/outgoing packet tables. If a packet with a write request had traveled through all ring nodes (full circle) and has come back to the original SSD, and the DRAM is still full, the case is treated as a conventional DRAM out-of-space, as shown in steps (17)-(18). In case of a read acknowledgement, the read data is transmitted back to the original SSD, and the data is output to host, as described in steps (19)-(20).

| Algorithm 2: Packet Handling |
|---|
| Input: Received Packet |
| (1)    If Packet{ID}~=SSD(ID) Then |
| (2)        If Packet{R/W}=W1 && (DRAM is not full) Then |
| (3)            DRAM-address ← request DRAM manager |
| (4)            write DRAM with Packet{Data} on DRAM-address |
| (5)            Packet ← {Packet{ID},Packet{#}, W0} |
| (6)        End |
| (7)        If Packet{R/W}=R0 Then |
| (8)            DRAM-address ← request RAM with ID, packet{#} |
| (9)            If found in DRAM Then |
| (10)   Packet ← {Packet{ID},Packet{#}, R1, Read Data} |
| (11)        End |
| (12)        End |
| (13)        Transmit Packet to next SSD on ring |
| (14)   Else // Packet{ID}=SSD(ID) |
| (15)        If Packet{R/W}=W0 Then |
| (16)            Update DRAM manager |
| (17)        Else If Packet{R/W}=W1 && (DRAM is full) Then |
| (18)            Perform as conventional DRAM out-of-space |
| (19)        Else if Packet{R/W}=R1 Then |
| (20)            Output Packet{Data} to host |
| (21)        End |
| (22)   End |

D. Alternative Inter-SSD Connection

To reduce interconnection cost, embodiments provide alternative inter-SSD communications through the managing I/O controller hub. For example, rather than transmitting the packet to the next SSD in the AFA ring, a transmitting SSDF will transmit the packet to the hub, which will then transmit the packet to the next SSD. The hub-SSD interface is extended beyond the storage protocol, such as Serial AT Attachment (SATA), Peripheral Component Interconnect express (PCIe), Non-Volatile Memory express (NVMe) or similar, to include an inner DRAM data transfer and acknowledgment instructions, as described in Section II.B, above, and as described with reference to FIG. 6, below. This configuration does not require external links and is discussed in the next Section.

FIGS. 3A-B illustrate an alternative inter-SSD communication through the I/O controller hub, according to an embodiment. In FIGS. 3A-B, the SSD controllers do not have the additional IN and OUT ports shown in FIG. 1B. FIG. 3A shows an SSD-2 104 requesting RAM space from an I/O controller hub 102, while FIG. 3B shows the hub 102 allocating available DRAM at SSD-3 105 and routing the data according to protocol.

E. RAM Extension and Other Resource Sharing

Following an approach according to an embodiment, additional AFA resources can be assigned at the hub, such as additional DRAM, to improve overall SSD performance. The SSDs can also share other resources, such as an error-correction decoder, using a similar architecture to that described above.

III. Implementation

To reduce interconnection cost, embodiments of the disclosure provide alternative inter-SSD communication through the following.

A. Inter-SSD Ring Connection

According to an embodiment, modifications include:

SSD controller hardware (HW) and software (SW)

Figure 4:
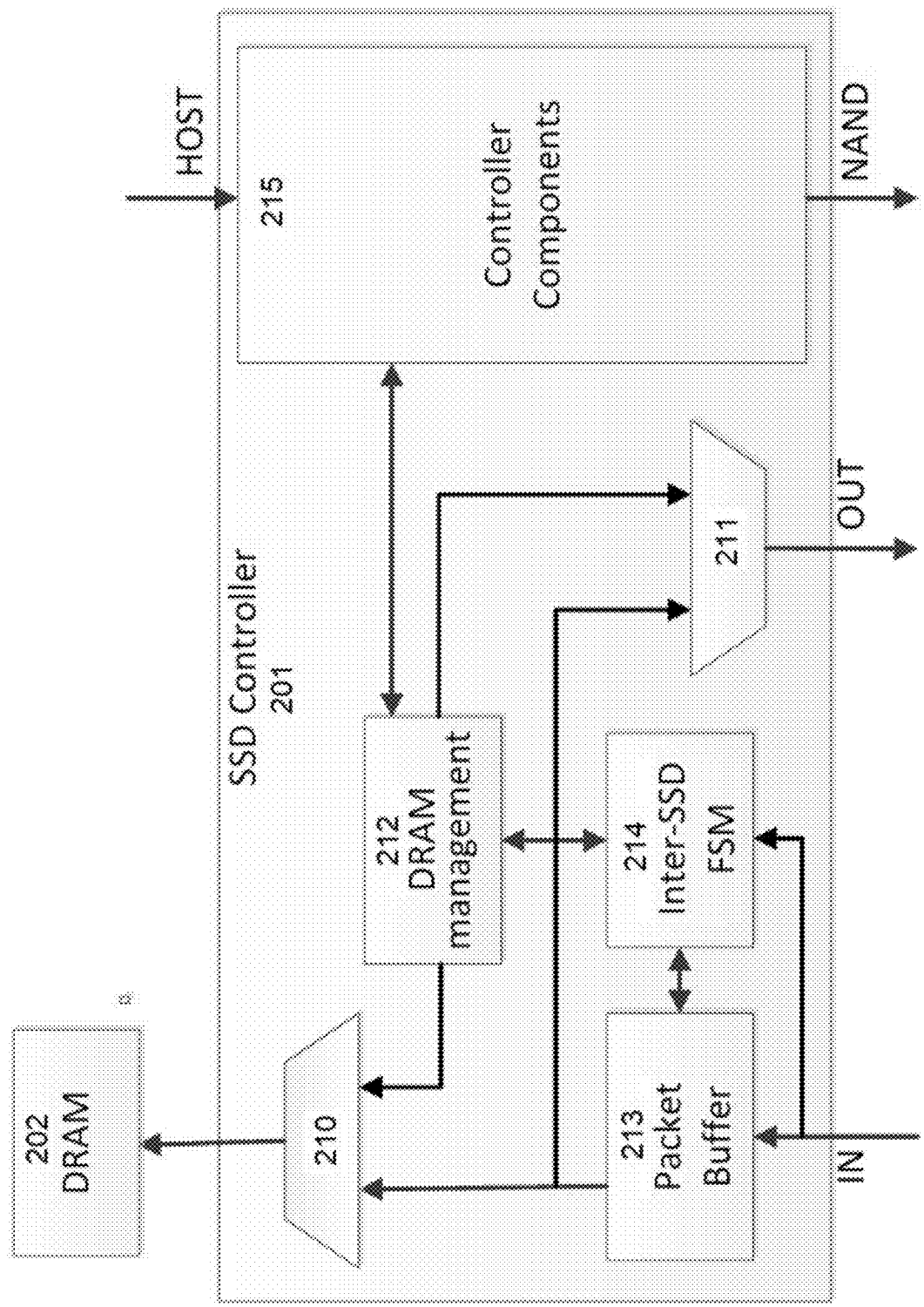
FIG. 4 illustrates data flow in an inter-SSD controller according to an embodiment of the disclosure.
Figure 5:
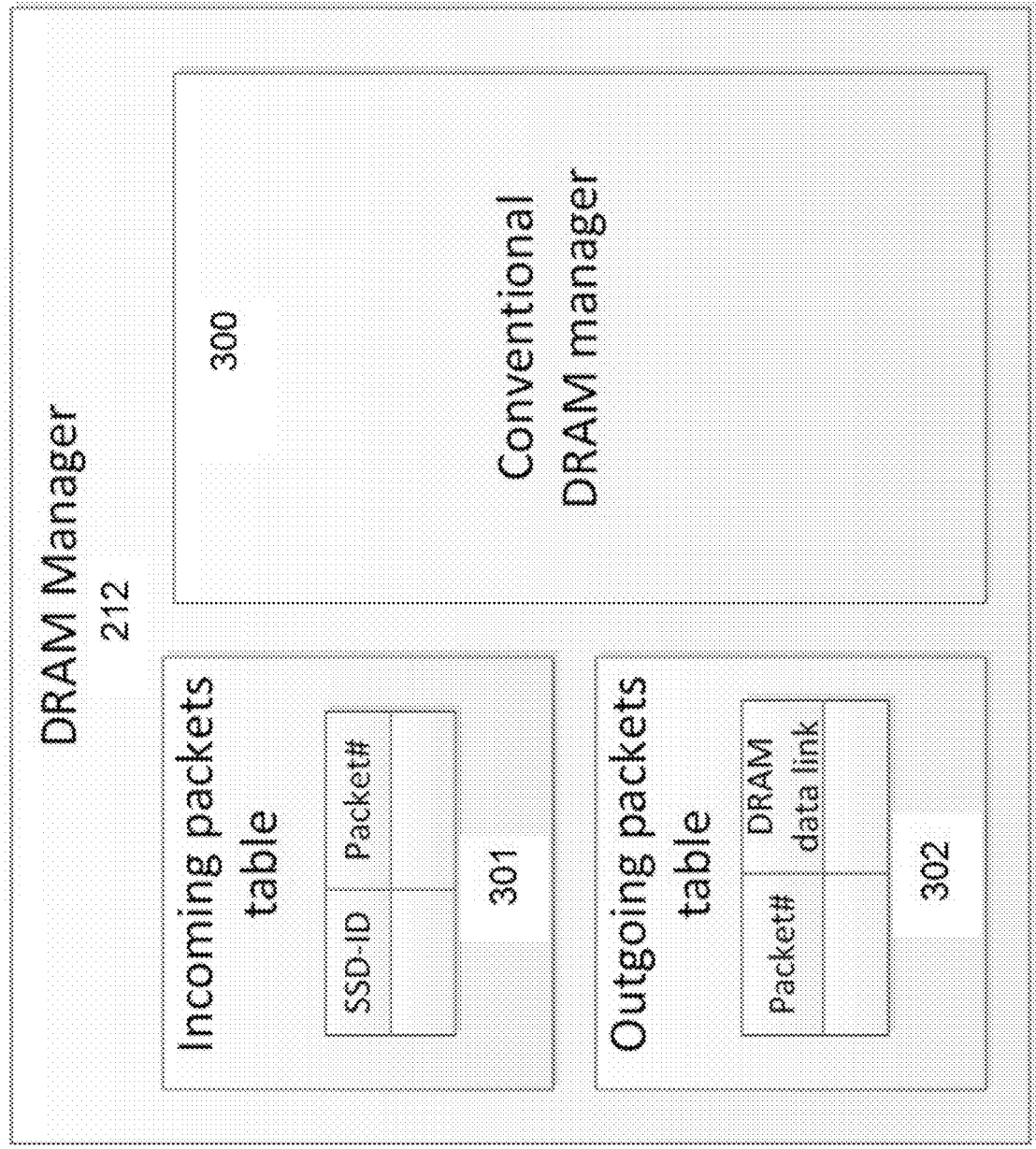
FIG. 5 illustrates an overview of a DRAM manager of FIG. 4, according to an embodiment of the disclosure.

Two additional IN and OUT ports, as shown in FIG. 1B. The controller requires dedicated hardware or software to send and receive packets, as described in Algorithms 1, and 2, above. The additional hardware is depicted in FIG. 4, which shows data flow in an inter-SSD communication module. FIG. 4 shows an exemplary SSDD controller 201, which includes multiplexers 210 and 211, a DRAM manager 212, a packet buffer 213, an inter-SSD finite state machine (FSM) 214, and additional controller components 215. Routing and handling algorithms are implemented at the inter-SSD FSM 214. DRAM management includes a conventional structure along with incoming DRAM data from other SSDs, identified by SSD-ID and packet #, and outgoing packet registration lists as a result of out-of-space DRAM, identified by regular table index. The additional hardware further includes multiplexers 210 and 211 and a packet buffer 2134 that are used for routing. An overview of a DRAM manager according to an embodiment is shown in FIG. 5, which shows a DRAM manager 212 that includes a conventional DRAM manager along with an incoming and outgoing packets tables 301 and 302 for detecting and restoring DRAM data.

Link cables

The interconnection of a ring topology requires N cables between N SSDs. The links can also be established using wireless communication, but current transmission rates and hardware/software complexity of such connections are not suitable for high-speed DRAM data transfer.

B. Inter-SSD Communication through Managing I/O Controller Hub

To support an alternative scheme according to an embodiment, only software modifications are required:

I/O controller hub SW

A hub driver according to an embodiment supports incoming DRAM data/acknowledgement packets in addition to its storage protocol. The required change can be implemented in the internal hub driver software.

SSD controller SW

A controller according to an embodiment transfers DRAM data to external IO, along with packet components as described in Section II.B, above. Such modification may be implemented by internal SSD processor software.

Figure 6:
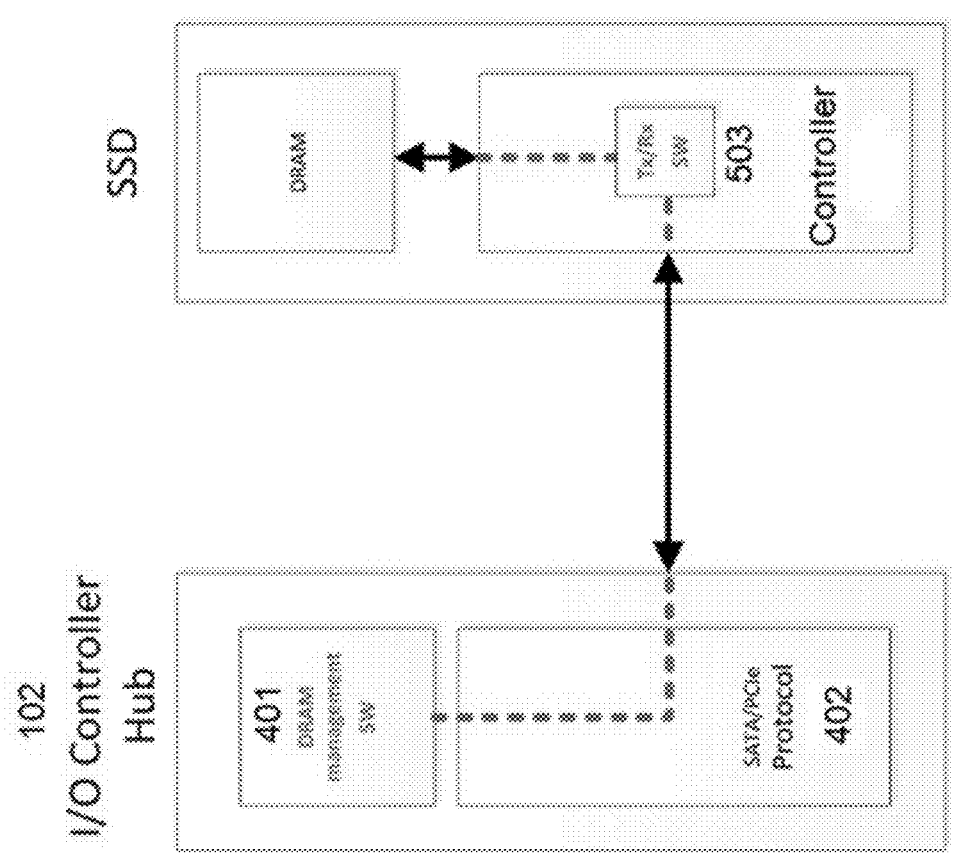
FIG. 6 illustrates an alternative inter-SSD communication through the I/O controller hub, according to an embodiment of the disclosure.

FIG. 6 illustrates an alternative inter-SSD communication through the I/O controller hub, according to an embodiment. The figure shows SSD-2 requesting DRAM space from the I/O controller 502, after which the hub 102 allocates available DRAM at SSD-3 and routes the data according to protocol. In FIG. 6, the hardware additions shown in FIGS. 5 and 6 are implemented in DRAM management software 401 at the hub and packet transmit/receive software 503 in the SSD controller 502. In addition, the SSD represents both the requesting SSD SSD-2 and the receiving SSD SSD-3.

IV. Analysis

In an embodiment, a normalized conventional bandwidth of single SSD depends on the probability for DRAM overflow p:

$$SSD_{BW}(p) = 1 - p(1-r).$$

The conventional bandwidth of an AFA is the product of the bandwidth, since SSDs are independent:

$$OFA_{BW}(p, N) = N \cdot [1 - p(1-r)].$$

In case of DRAM sharing, performance decreases only when all SDDs have full DRAMs. However, since all SSDs use each others memory, the probability for overflow p increases. An analysis according to an embodiment assumes that if a certain SSD DRAM is out-of-space, another SSD in the same AFA will be able to provide DRAM, as long as it does not overflow in its independent workload. In this case, every SSD with DRAM overflow needs a fellow SSD that is active with available DRAM space. For simplicity, an embodiment will assume an even number of SSDs (N).

For two SSDs in an AFA with DRAM sharing (DS), the performance degrades only when both overflow. The normalized performance for single SSD is the overall AFA performance divided by N:

$$SSD_{DS}(p, N=2) = \left[\binom{2}{0}(1-p)^2 p^0 + \binom{2}{1}(1-p)^1 p^1\right] + \binom{2}{2}(1-p)^0 p^2 \cdot r \cdot$$
$$2 = 1 - p^2 + p^2 \cdot r.$$

For four SSDs, up to two SSDs with overflow does not change performance. If three SSDs overflow, performance degrades in two SSDs, since there is one left that can support DRAM sharing. If four SSDs overflow, performance degrades for all SSDs:

$$SSD_{DS}(p, N=4) = \left[\binom{4}{0}(1-p)^4 p^0 + \binom{4}{1}(1-p)^3 p^1 + \binom{4}{2}(1-p)^2 p^2\right] +$$
$$\binom{4}{3}(1-p)^1 p^3 \cdot \frac{2}{4} r + \binom{4}{4}(1-p)^0 p^4 \cdot r.$$

The generalization to N SSDs in AFA is:

$$SSD_{DS}(p, N) = \sum_{i=0}^{N/2}\binom{N}{i}(1-p)^{N-i}p^i + \sum_{i=\frac{N}{2}+1}^{N}\binom{N}{i}(1-p)^{N-i}p^i \cdot \frac{N-2(N-i)}{N}r$$

Hence:

$$SSD_{DS}(p, N) = \sum_{i=0}^{N/2}\binom{N}{i}(1-p)^{N-i}p^i + \sum_{i=\frac{N}{2}+1}^{N}\binom{N}{i}(1-p)^{N-i}p^i \cdot \frac{2i-N}{N}r.$$

Figure 7:
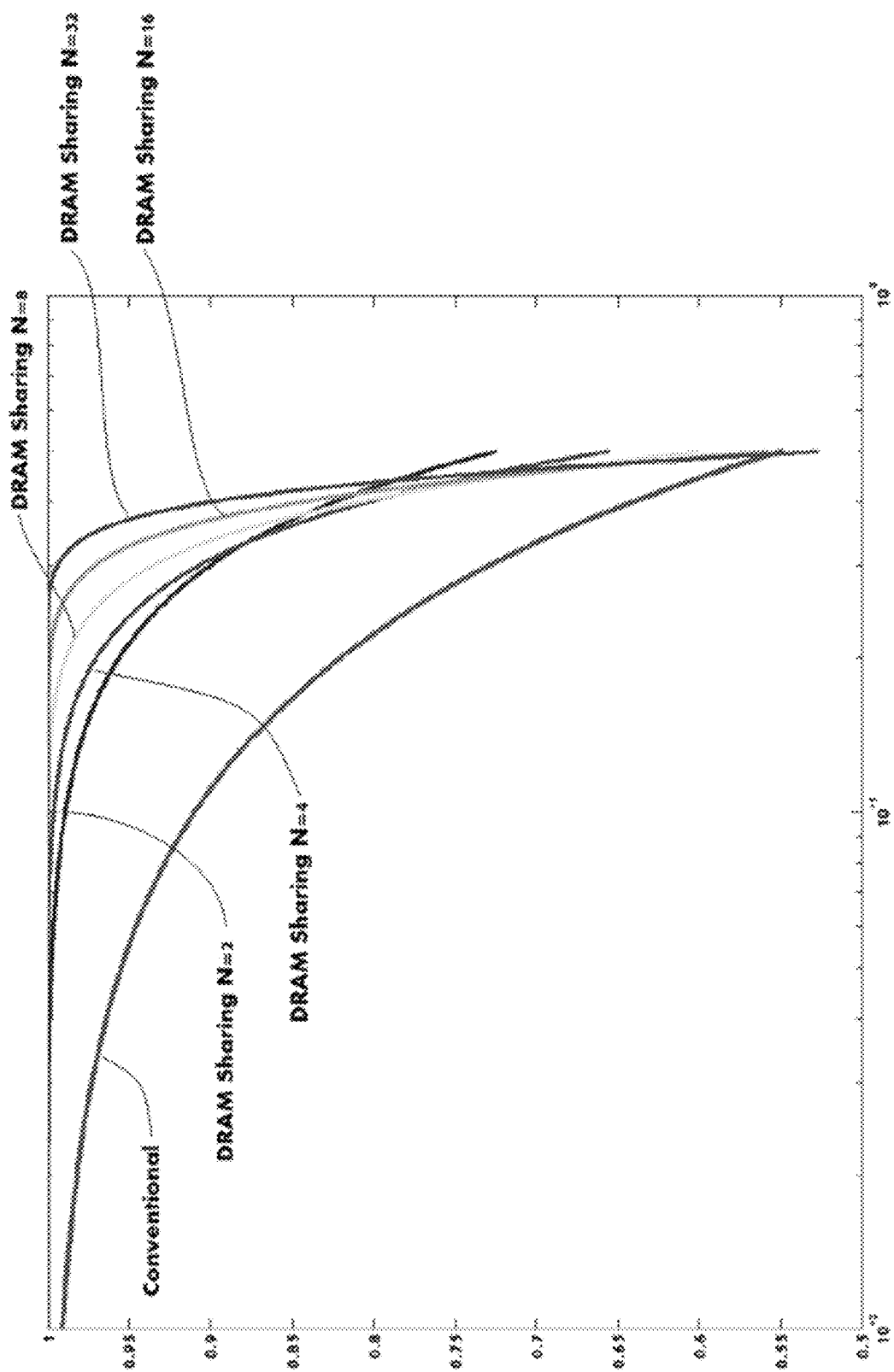
FIG. 7 is a graph of a Normalized AFA bandwidth vs. the probability of single SSD DRAM overflow according to an embodiment of the disclosure.

The analysis results for $p=10^{-2}$ to $5 \cdot 10^{-1}$, $r=0.1$ and $N=2$, 4, 8, 16 and 32 SSDs are plotted against that for a conventional AFA architecture in FIG. 7, which shows the normalized AFA bandwidth (performance) vs. the probability of single SSD DRAM overflow. Note that an up to 2× improvement in performance is observed with higher DRAM in high overflow probabilities and high number of SSDs in the AFA.

V. System Implementations

It is to be understood that embodiments of the present disclosure can be implemented in various forms of hardware, software, firmware, special purpose processes, or a combination thereof. In one embodiment, read/write request and packet handling algorithms according to embodiments of the present disclosure can be implemented in hardware as an application-specific integrated circuit (ASIC), or as a field programmable gate array (FPGA). In another embodiment, algorithms according to embodiments of the present disclosure can be implemented in software as an application program tangible embodied on a computer readable program storage device. The application program can be uploaded to, and executed by, a machine comprising any suitable architecture.

Figure 8:
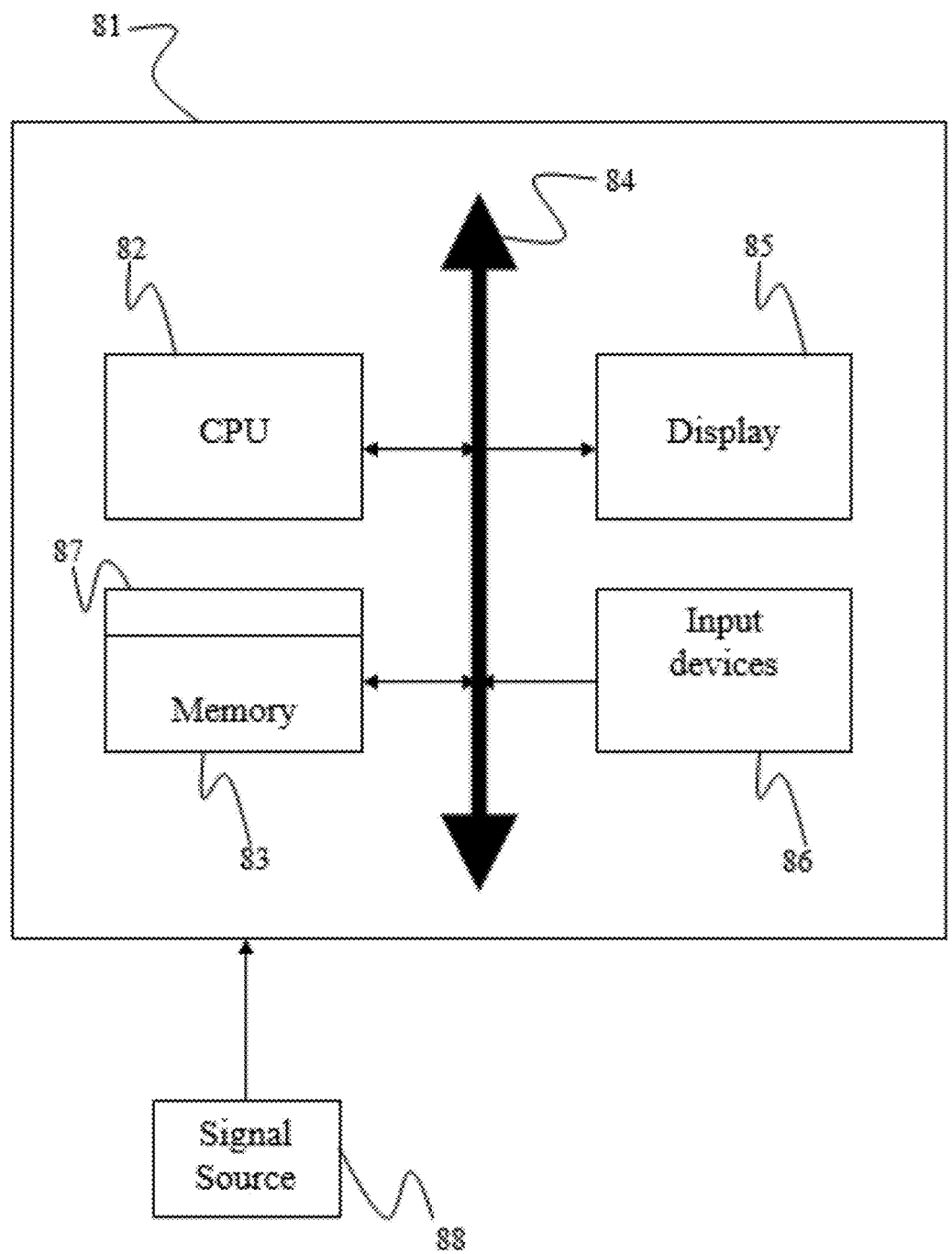
FIG. 8 is a block diagram of a system for implementing read/write request and packet handling algorithms, according to an embodiment of the disclosure.

FIG. 8 is a block diagram of a system for implementing read/write request and packet handling algorithms, according to an embodiment of the disclosure. Referring now to FIG. 8, a computer system 81 includes, inter alia, a central processing unit (CPU) or controller 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. Algorithms according to embodiments of the present disclosure can be implemented as a routine 87 that is stored in memory 83 and executed by the CPU or controller 82 to process the signal from the signal source 88. As such, the computer system 81 is a general purpose computer system that becomes a specific purpose computer system when executing the routine 87 of the present disclosure. Alternatively, as described above, embodiments of the present disclosure can be implemented as an ASIC or FPGA 87 that is in signal communication with the CPU or controller 82 to process the signal from the signal source 88.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for accelerating computational storage in an all-flash-array network that comprises a plurality of solid state drives (SSDs) connected in a ring topology, wherein each SSD of the plurality of SSDs includes a controller and a dynamic random access memory (DRAM) connected to the controller, the method comprising:

receiving, by a controller of a first SSD, a request to read or write data from a DRAM associated with the first SSD;

creating a packet that includes an identifier for the first SSD in the ring topology, an identifier for the packet, and a read/write flag that identifies the request; and transmitting the packet to a next SSD in the ring topology, wherein the read/write flag indicates a read-request in response to the request being a read request and a read data address being not located in the DRAM, and the read/write flag indicates a write request and the packet includes data to be written in response to the request being a write request and the DRAM being full.

2. The method of claim 1, further comprising:

verifying that the read/write flag indicates the read request and the read data address is located in the DRAM, and reading data from the read data address in the DRAM.

3. The method of claim 1, further comprising: verifying that the read/write flag indicates the write request and the DRAM is not full, and writing data to a write address in the DRAM.

4. The method of claim 1, further comprising:

receiving, by the next SSD in the ring topology, the packet;

verifying that the next SSD in the ring topology differs from the first SSD in the ring topology, the read/write flag indicates a write-request and a DRAM associated with the next SSD is not full;

requesting a write address for a DRAM associated with the next SSD from a controller of the next SSD;

writing the data in the packet to the write address for the DRAM;

updating the packet by setting the read/write flag to indicate a write-acknowledgement; and transmitting the packet to a next SSD in the ring topology.

5. The method of claim 1, further comprising:
receiving, by the next SSD in the ring topology, the packet;
verifying that the next SSD in the ring topology differs from the first SSD in the ring topology, and the read/write flag indicates a read-request;
requesting a read address for a DRAM associated with the next SSD from a controller of the next SSD, based on the identifier for the first SSD in the ring topology and the identifier of the packet;
updating the packet by setting the read/write flag to indicate a write-acknowledgement, and replacing the data to be written with data read from the read-address; and
transmitting the packet to a next SSD in the ring topology.

6. The method of claim 1, further comprising:
receiving, by the next SSD in the ring topology, the packet;
verifying that the next SSD in the ring topology is the first SSD in the ring topology;
updating incoming/outgoing packet tables of the controller of the first SSD, in response to the read/write flag indicating a write-acknowledgement;
performing a DRAM out-of-space procedure, in response to the read/write flag indicating a write-request and the DRAM associated with the first SSD is full; and
outputting the data of the packet to a host of the all-flash array, in response to the read/write flag indicating a read-acknowledgement.

7. The method of claim 1, wherein the packet includes fields for an SSD identifier, an identifier for the packet, a read/write request/acknowledge flag, and data to be either written to the a DRAM associated with an SSD or read from a DRAM associated with an SSD.

8. An architecture for accelerating computational storage in an all-flash-array, comprising:
a plurality of solid state drives (SSDs) connected to an input/output (I/O) hub, wherein each SSD of the plurality of SSDs includes a controller, a DRAM connected to the controller, and a plurality of NAND memories connected to the controller,
wherein the plurality of SSDs are connected in a ring topology in which each controller includes an input port and an output port, each input port of each SSD is connected by a connector to an output port of a predecessor SSD, and the input port of a first SSD of the plurality of SSDs is connected by a connector to the output port of a last SSD of the plurality of SSDs; and
a processor connected to the I/O hub,
wherein the controller of each SSD comprises:
a DRAM manager connected to the DRAM and the output port;
a packet buffer connected to the input port, the DRAM and the output port;
an inter-SSD finite state machine (FSM) connected to the packet buffer, the input port, and the DRAM manager, wherein the inter-SSD FSM performs packet routing and handling of received packets;
a first multiplexer that connects the DRAM manager and the packet buffer to the output port;
a second multiplexer that connects the DRAM manager and the packet buffer to the DRAM; and
additional components that connect the DRAM manager to a host and to the NAND memories.

9. The architecture of claim 8, wherein each SSD further includes a hardware accelerator connected to the DRAM, wherein the hardware accelerator accelerates tasks other than reading or writing to the DRAM of each SSD.

10. The architecture of claim 8, further comprising an artificial intelligence (AI) server, wherein the AI server is an SSD that includes a processor, a DRAM connected to the processor, and a plurality of NAND memories connected to the processor.

11. The architecture of claim 8, wherein the connector is a cable.

12. The architecture of claim 8, wherein the packet routing comprises:
receiving, by a controller of a first SSD, a request to read or write data from a DRAM associated with the first SSD,
creating a packet that includes an identifier for the first SSD in the ring topology, an identifier for the packet, and a read/write flag that identifies the request; and
transmitting the packet to a next SSD in the ring topology,
wherein the read/write flag indicates a read-request in response to the request being a read request and a read data address being not located in the DRAM, and the read/write flag indicates a write request and the packet includes data to be written in response to the request being a write request and the DRAM being full.

13. The architecture of claim 8, wherein the packet handling comprises:
receiving, by the next SSD in the ring topology, the packet;
verifying that the next SSD in the ring topology differs from the first SSD in the ring topology, the read/write flag indicates a write-request and a DRAM associated with the next SSD is not full;
requesting a write address for a DRAM associated with the next SSD from a controller of the next SSD;
writing the data in the packet to the write address for the DRAM;
updating the packet by setting the read/write flag to indicate a write-acknowledgement; and
transmitting the packet to a next SSD in the ring topology.

14. The architecture of claim 8, wherein the packet handling comprises:
receiving, by the next SSD in the ring topology, the packet;
verifying that the next SSD in the ring topology differs from the first SSD in the ring topology, and the read/write flag indicates a read-request;
requesting a read address for a DRAM associated with the next SSD from a controller of the next SSD, based on the identifier for the first SSD in the ring topology and the identifier of the packet;
updating the packet by setting the read/write flag to indicate a read-acknowledgement, and replacing the data to be written with data read from the read-address; and
transmitting the packet to a next SSD in the ring topology.

15. The architecture of claim 8, wherein the DRAM manager comprises:
an incoming packets table that includes a field for an identifier of an SSD and a field for an identifier of an incoming packet; and
an outgoing packets table that includes a field for an identifier of an outgoing packet and a field for a DRAM data link.

16. An architecture for accelerating computational storage in an all-flash-array, comprising:
- a plurality of solid state drives (SSDs) connected to an input/output (I/O) hub, wherein each SSD of the plurality of SSDs includes a controller, a DRAM connected to the controller, and a plurality of NAND memories connected to the controller; and
- a processor connected to the I/O hub,
- wherein the I/O hub is configured to support incoming DRAM data and acknowledgement packets, and each SSD controller is configured to route DRAM read and write requests, and to handle received packets, and
- the packet routing comprises:
  - receiving, by a controller of a first SSD, a request to read or write data from a DRAM associated with the first SSD,
  - creating a packet that includes an identifier for the first SSD, an identifier for the packet, and a read/write flag that identifies the request; and
  - transmitting the packet to the I/O hub, wherein the I/O hub transmits the packet to a next SSD,
- wherein the read/write flag indicates a read-request in response to the request being a read request and a read data address being not located in the DRAM, and the read/write flag indicates a write request and the packet includes data to be written in response to the request being a write request and the DRAM being full.

17. The architecture of claim 16, wherein the packet handling comprises:
- receiving, by the next SSD, the packet;
- verifying that the next SSD differs from the first SSD, the read/write flag indicates a write-request and a DRAM associated with the next SSD is not full;
- requesting a write address for a DRAM associated with the next SSD from a controller of the next SSD;
- writing the data in the packet to the write address for the DRAM;
- updating the packet by setting the read/write flag to indicate a write-acknowledgement; and
- transmitting the packet to the I/O hub.

18. The architecture of claim 16, wherein the packet handling comprises:
- receiving, by the next SSD, the packet;
- verifying that the next SSD from the first SSD, and the read/write flag indicates a read-request;
- requesting a read address for a DRAM associated with the next SSD from a controller of the next SSD, based on the identifier for the first SSD and the identifier of the packet;
- updating the packet by setting the read/write flag to indicate a read-acknowledgement, and replacing the data to be written with data read from the read-address; and
- transmitting the packet to the I/O hub.

* * * * *